United States Patent [19]

Mauldin

[11] Patent Number: 4,527,649
[45] Date of Patent: Jul. 9, 1985

[54] PAVER STEERING APPARATUS

[76] Inventor: Herbert N. Mauldin, P.O. Box 3992, Greenville, S.C. 29608

[21] Appl. No.: 486,107

[22] Filed: Apr. 18, 1983

[51] Int. Cl.³ .............................................. B62D 11/04
[52] U.S. Cl. .................................................. 180/6.48
[58] Field of Search ................ 180/322, 6.48, 6.66, 180/6.7; 404/101

[56] References Cited

U.S. PATENT DOCUMENTS

| | | | |
|---|---|---|---|
| 3,151,694 | 10/1964 | Rogers | 180/6.32 |
| 3,362,439 | 1/1968 | Davis et al. | 180/6.48 |
| 3,448,577 | 6/1969 | Crawford | 60/420 |
| 3,550,708 | 12/1970 | Paramythioti | 180/6.48 |
| 3,641,765 | 2/1972 | Hancock et al. | 60/484 |
| 3,666,034 | 5/1972 | Stuller et al. | 180/6.48 |
| 3,700,288 | 10/1972 | Davin et al. | 180/6.48 |
| 3,712,403 | 1/1973 | Pakosh | 180/6.48 |
| 3,972,379 | 8/1976 | Norris | 180/234 |
| 4,100,738 | 7/1978 | Seaberg et al. | 180/6.48 |
| 4,244,184 | 1/1981 | Baldauf et al. | 60/420 |

FOREIGN PATENT DOCUMENTS 568384  6/1958  Belgium ............................... 180/322

Primary Examiner—John A. Pekar
Attorney, Agent, or Firm—Bailey & Hardaway

[57] ABSTRACT

Steering apparatus and method is illustrated for a paving vehicle having variable displacement hydrostatic pumps supplying power to hydraulic motors on each side of the vehicle with controls for the pumps varying the speed of fixed directional traction means located on respective sides of the vehicle.

5 Claims, 4 Drawing Figures

4,527,649

PAVER STEERING APPARATUS

BACKGROUND OF THE INVENTION

Pavers of the type which utilize a hopper with a screed bar for spreading the asphalt and providing a smooth surface are sometimes carried by wheels which are turned for providing steering, or such may be driven by other suitable traction means such as Caterpillar tracks. In both instances, steering is commonly provided by a system of valves controlling a pump and motor driving the respective traction means on each side at different speeds. Such apparatus is illustrated in U.S. Pat. Nos. 3,151,694; 3,448,577; 3,972,379; and 4,244,184. An apparatus utilizing a hydrostatic transmission having a variable displacement pump supplying respective sides of a vehicle having wheels, each driven by a hydrostatic motor, is illustrated in U.S. Pat. No. 3,641,765. The apparatus of this patent, however, is controlled by valves and provides a slight differential in speed when the wheels are turned in order to effect steering of the vehicle.

Accordingly, it is an important object of this invention to provide a steering apparatus for a mobile paver which is mechanically controlled producing faster response than has heretofore been comtemplated. By providing an individual motor and pump operating the traction means on each side of the mobile paving apparatus to effect turning, a less expensive construction is possible.

Another object of the invention is to provide a more easily operated steering apparatus which may be controlled from either side of the vehicle while conserving space by limiting the amount of control mechanism required. Thus, control mechanism may be positioned adjacent larger frame components since limitations caused by the relatively large space which must heretofore have been assigned to the operating components or apparatus are reduced.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
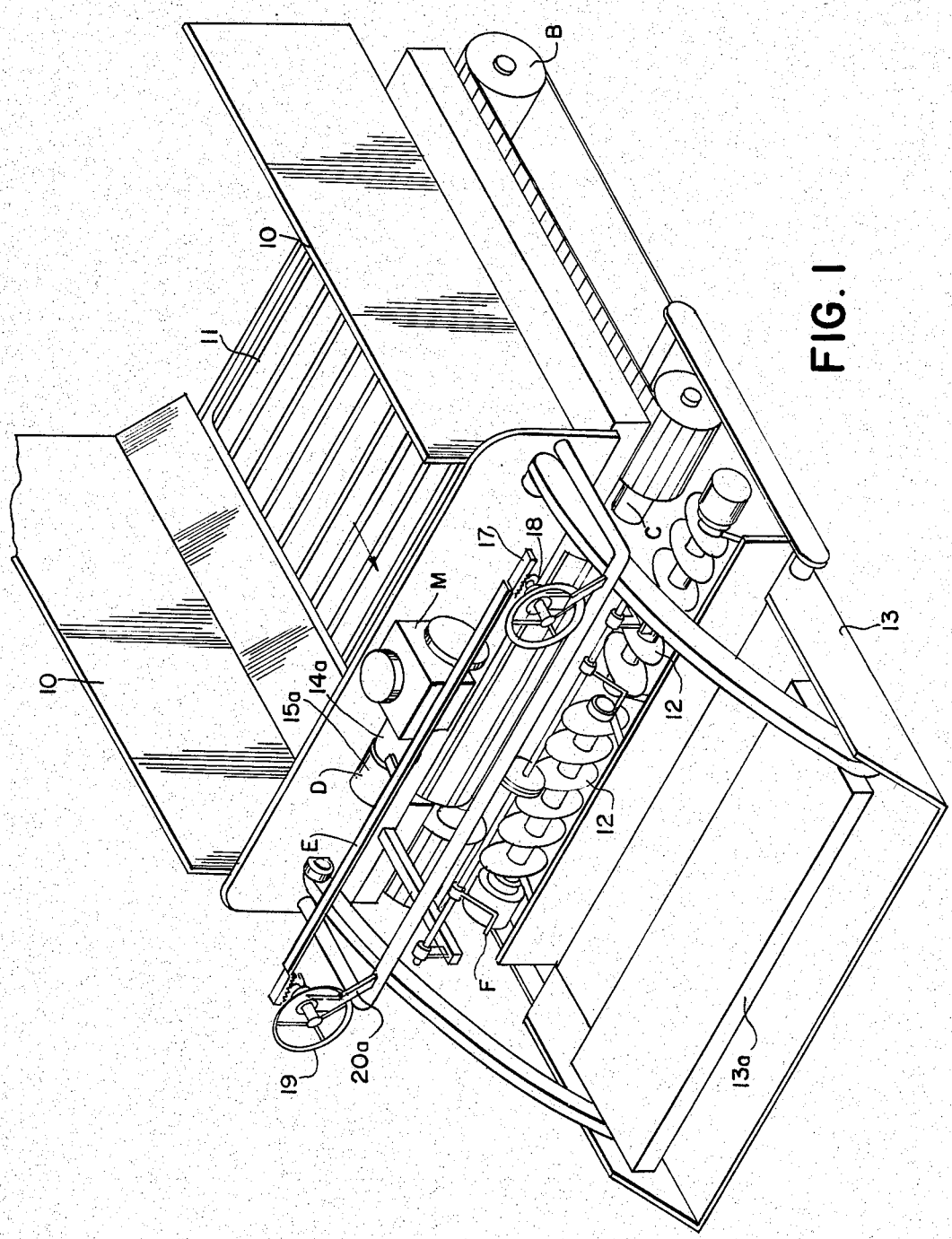
FIG. 1 is a schematic perspective view illustrating the operating components of paving apparatus equipped with steering apparatus constructed in accordance with the present invention.

The drawing illustrates a mobile paving apparatus having a hopper, a screed and means delivering asphalt from the hopper to the screed. Ground engaging traction means A are provided for supporting the paving apparatus on each side thereof. Mounting means B maintain the traction means on respective sides aligned and in substantially parallel relation to each other longitudinally of the paving apparatus. A hydraulic motor C is carried on each side of the paving apparatus driving the ground engaging traction means on respective sides of the paving apparatus. A pump D supplies fluid to each respective hydraulic motor. Control means E, including linkage means, varies the output of said pumps increasing one and decreasing the other, varying the fluid supplied the hydraulic motor on a selected one side of said paving apparatus with respect to that supplied to the hydraulic motor on the other side of said paving apparatus. Means F are provided for manually advancing and retracting the means carrying the means moved responsive to the linkage movement.

The mobile paving apparatus is illustrated as including a suitable hopper 10 which has a bottom 11 in the form of a conveyor driven in the direction of the arrow in FIG. 1 for conveying asphalt to be distributed evenly from side to side as by a rotating auger 12. The auger 12 distributes asphalt evenly for spreading and smoothing by a suitable mechanism including a screed bar 13 positioned beneath the operator's platform 13a. The ground engaging traction means A are illustrated as being mounted on drive means B which includes suitable spaced transverse shafts. A hydraulic motor C is provided for each traction assembly means A on each side of the vehicle and a variable displacement pump D driven by an engine M is provided for supplying fluid to each respective hydraulic motor.

Figure 2:
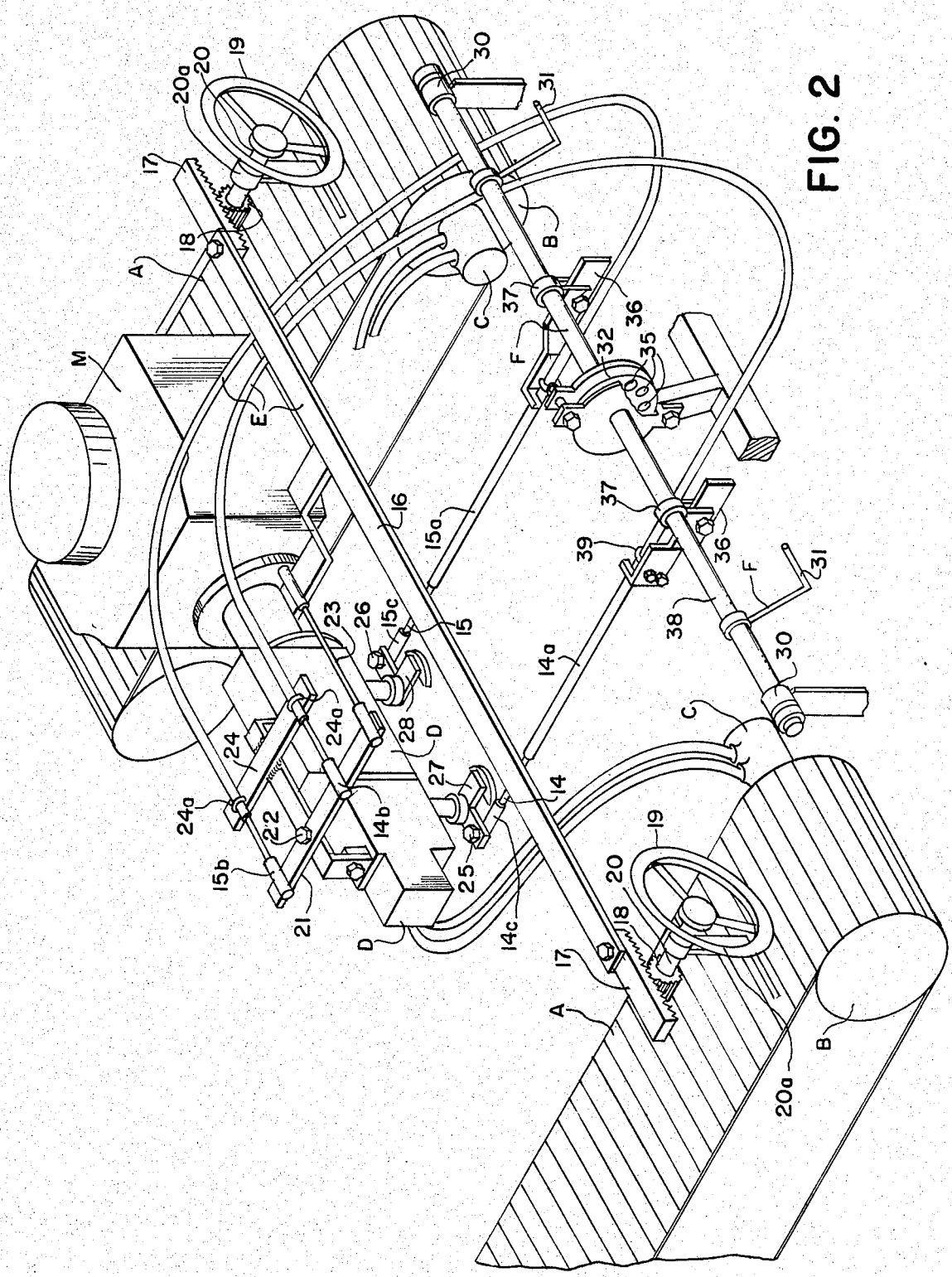
FIG. 2 is an enlarged perspective view schematically illustrating a drive mechanism constructed in accordance with the present invention.
Figure 3:
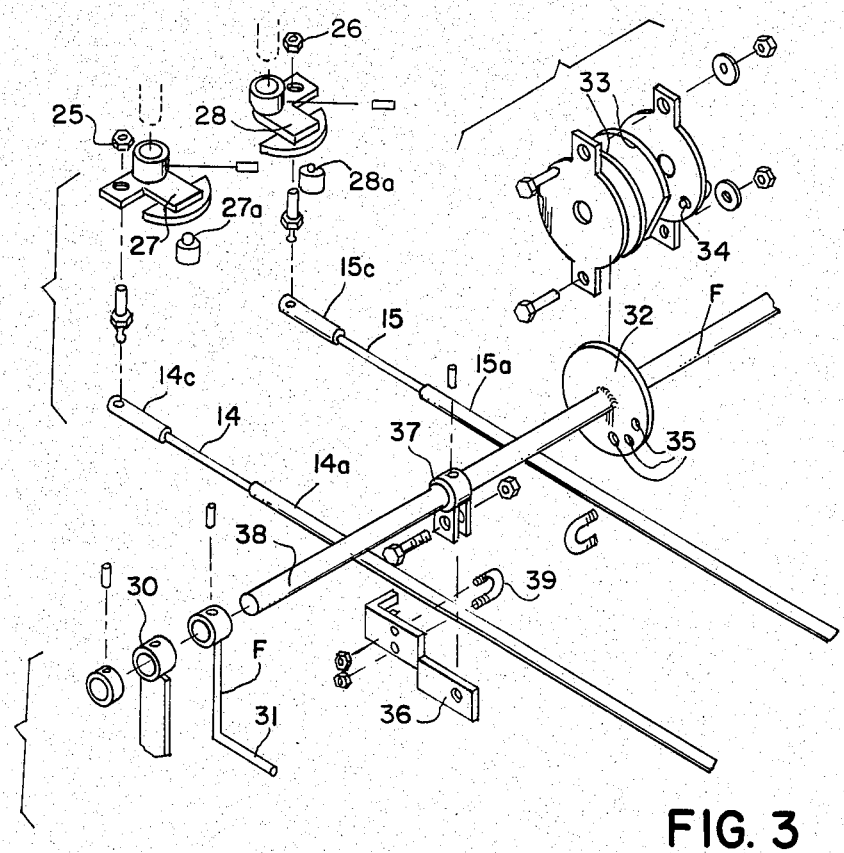
FIG. 3 is perspective view further illustrating the steering mechanism of FIGS. 1 and 2.

The control means E for varying the output of the pumps is best illustrated in FIGS. 2 and 3 and includes separate flexible cables 14 and 15 which are carried by respective sheaths 14a and 15a. The means E further includes steering mechanism having a bar 16 which extends from one side of the paving apparatus to the other. The bar E carries a rack mechanism 17 adjacent each end thereof and a pinion 18 is provided for being driven by respective mechanical steering mechanism illustrated in the form of steering wheels 19 and shafts 20 carried on the supports 20a. The flexible cables are connected on one end to the link 21 which is centrally pivoted as at 22. The link 21 is operated by the link 23 responsive to movement of the bar 16 by turning the steering wheel. The respective connections for the flexible cables to the bar 21 are illustrated in 14b and 15b respectively. A support means for carrying the cables and their respective sheaths for sliding movement includes a fixed bar 24 with mounting brackets 24a at opposite ends. The opposite ends of the flexible cable are attached as at 14c and 15c pivotally, as at 25 and 26 to linkage 27 and 28, for operating the respective variable displacement hydrostatic pumps D. Referring now to FIG. 3, detents 27a and 28a are provided for affording a neutral position for the aforesaid pump control linkage.

The advancing and retracting means F which is mounted for oscillation within the brackets 30 responsive to the movement of the handles 31 is provided for overriding the linkage steering mechanism described above. The means F includes a centrally disposed disk 32, fixed to a shaft 38, having friction means such as leather disks 33 pressed against a detent base as illustrated at 34 for engaging selective openings 35 for affording neutral, forward and reverse positions for the mechanism F. Brackets 36 are each affixed as at 37 to the shaft 38 for positioning bracket means 39 engaging the flexible cables.

Thus, the speed of rotation of the ground engaging means on respective sides of the paver is controlled in such a way as to cause skidding of one with respect to the other, providing a turning action of the paving apparatus.

Figure 4:
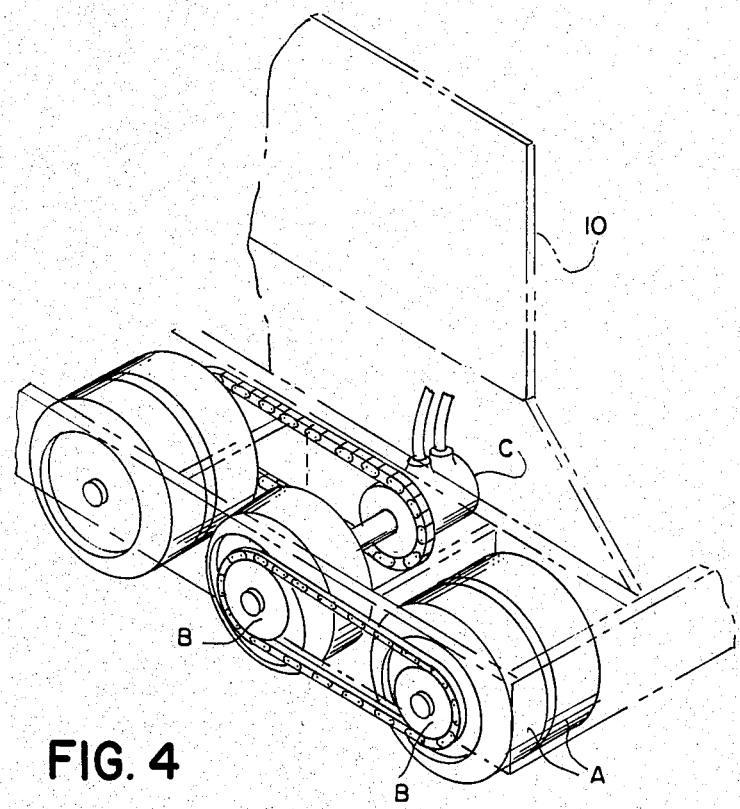
FIG. 4 is a perspective view illustrating a modified form of the invention wherein wheels are illustrated in lieu of the Caterpillar tracks of FIG. 1.

FIG. 4 illustrates a modified form of the invention in which permanently aligned wheels are provided in lieu of the longitudinally mounted tracks. The wheels A are suitably driven by the hydrostatic motor C through the mounting and driving means B.

Operation

In operation, a variable displacement pump means is utilized for supplying power to traction means on each side of the paving apparatus. A motor is driven by a respective pump at each side of the paving apparatus. By advancing and retracting the linkage, the output of the pumps is controlled. Steering of the paving apparatus is accomplished by varying the output of at least one of the variable displacement pump means by overriding the advancing and retracting linkage producing a speed differential between the output of said respective motors. By first reducing and then reversing the output of one of the pumps while maintaining the output of the other, rapid turning may be accomplished.

While a preferred embodiment of the invention has been described using specific terms, such description is for illustrative purposes only and it is to be understood that changes and variations may be made without departing from the spirit of scope of the following claims.

What is claimed is:

1. In a mobile paving apparatus having a hopper, a screed and means delivering asphalt from said hopper to said screed, the improvement comprising:

ground engaging traction means supporting said paving apparatus on each side thereof;

mounting means maintaining said traction means aligned in substantially parallel relation to each other longitudinally of said paving apparatus;

a pair of opposed hydraulic fluid motors, one carried on each side of said paving apparatus, driving said ground engaging traction means on respective sides of said paving apparatus;

a pump supplying fluid to each respective hydraulic motor;

means varying the output of at least one of said pumps varying the fluid supplied the hydraulic motor on one side of said paving apparatus with respect to that supplied to the hydraulic motor on the other side of said paving apparatus;

said means varying the output including steering apparatus, linkage means moved responsive to said steering apparatus, and means moved responsive to said linkage means controlling said pumps; and advancing and retracting means carrying said means moved responsive to said linkage means for movement with respect thereto;

whereby rotation of the ground engaging means on respective sides is controlled in such a way as to cause skidding of one with respect to the other causing turning of the paving apparatus.

2. The structure set forth in claim 1 wherein said pumps are variable displacement hydrostatic pumps.

3. The structure set forth in claim 1 wherein said means moved responsive to said linkage means includes flexible cables.

4. The structure set forth in claim 3 wherein said advancing and retracting means have oscillatable mounting means, and sheath means slideably carrying said cables having fixed attachment with respect to said oscillatable mounting means.

5. The structure set forth in claim 4 including friction means having a detent limiting movement of said oscillatable mounting means.

* * * * *